UNITED STATES PATENT OFFICE.

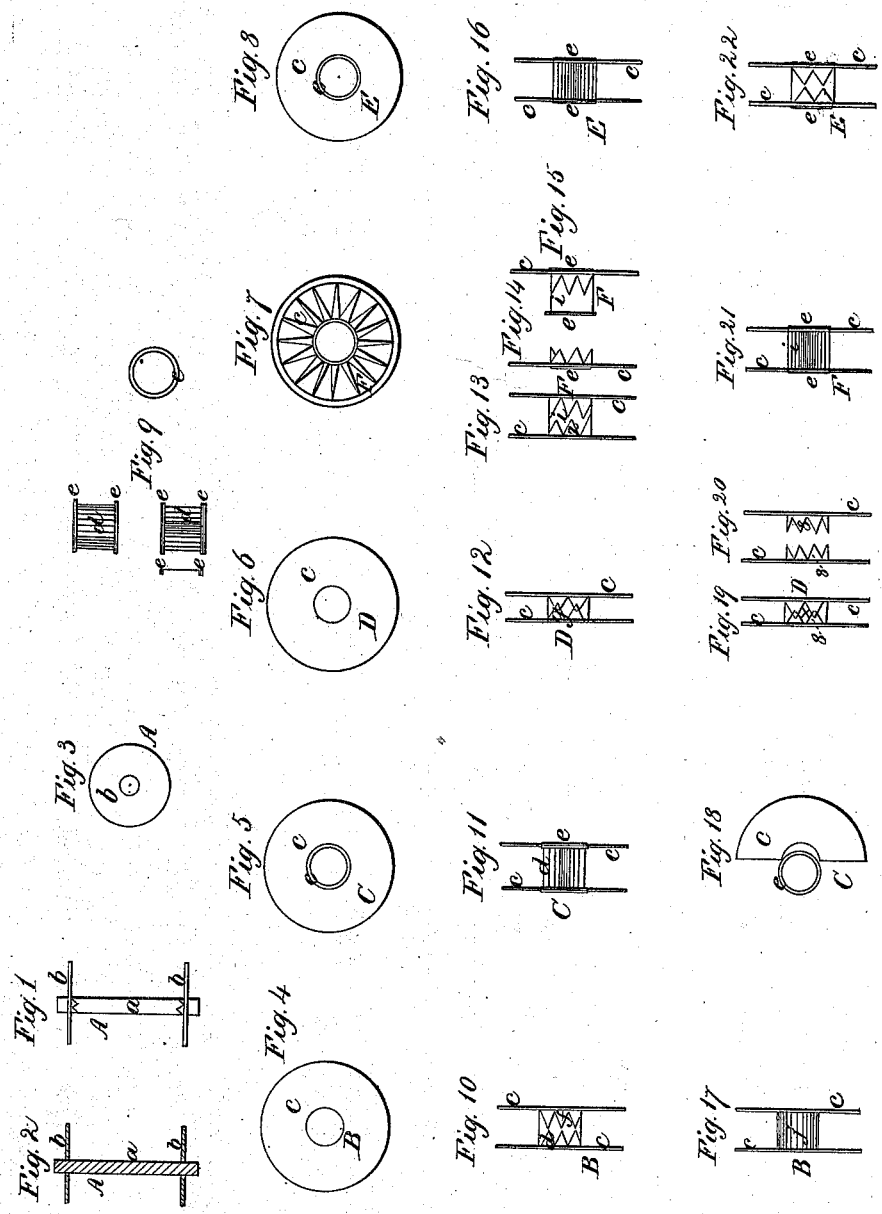

DWIGHT TRACY, OF WORCESTER, MASSACHUSETTS, ASSIGNOR TO HIMSELF, AND JOSEPH P. HALE, OF NEW YORK, N. Y.

IMPROVEMENT IN SPOOLS FOR SEWING-THREAD.

Specification forming part of Letters Patent No. 35,493, dated June 3, 1862.

*To all whom it may concern:*

Be it known that I, DWIGHT TRACY, of Worcester, in the county of Worcester and State of Massachusetts, have invented a new and Improved Method of Constructing Spools for Putting up Thread, Silk, &c.; and I do hereby declare the following to be a full, clear, and exact description thereof, reference being had to the accompanying drawings, figures, and letters of reference thereon, making part of this specification.

Of the said drawings, Figures 1, 2, and 3 show the construction of spool A. Figs. 4, 10, and 17 show the construction of spool B. Figs. 5, 11, and 18 show the construction of spool C, the spool-head in Fig. 18 being shown in section. Fig. 9 shows the manner of securing the heads to the barrel of the spool C. Figs. 6, 12, 19, and 20 show the construction of spool D. Figs. 7, 13, 14, 15, and 21 show the construction of the metallic spool F. Figs. 8, 16, and 22 show the construction of the spool E.

The shape, great bulk, and weight of the spools ordinarily used for putting up sewing-threads prior to the date of my invention have, so far as I am aware, rendered futile all attempts at their practical application to carrying the under thread of sewing-machines making the lock-stitch; hence the necessity for rewinding the thread for this class of machines, which consumes a considerable portion of the operator's time. In order to lay the thread smoothly and evenly on the ordinary spools, it has to be wound very tight, stretching it quite hard. The thread is kept thus extended by the unyielding materials of the ordinary spools, thus destroying a large part of its elasticity, which it is of the utmost importance to preserve, as the seam formed with it is much more elastic and durable.

The nature and object of my invention is to produce spools which shall not destroy or impair the elasticity of the thread wound upon them, and of light compact make, so as to adapt them to the carrying the under thread of the above-named lock-stitch machines, and at the same time be equally available for all other purposes as the common spool, and of such low cost that the manufacturer can profitably substitute them for those now used.

To enable others skilled in the art to make and use my invention, I will proceed to describe its construction and operation.

The spool A has a spindle, $a$, upon which are placed the heads $b\ b$ of thin elastic material. The heads are cut to fit the spindle by punching the material in V-shaped parts, so that they shall, when glued, soldered, or otherwise fastened to the spindle, become strong, as plainly shown in Fig. 1.

The spool B, as seen in Figs. 4, 10, and 17, is made by punching V-shaped parts $d$ and $f$ inward and holding them in place by a ring, $j$, which is glued or soldered and made strong.

The spool C is shown in Figs. 5, 9, 11, and 18. The heads $c$ are cut to fit the barrel $d$, which has a collar or flange struck up in the metal, leaving a portion projecting outward of the same diameter as the barrel. The head is then placed upon the portion of the barrel outside the flange and the metal turned up, so as to clamp the head securely, and thereby render it strong for use.

The spool D (shown in Figs. 6, 12, 19, and 20) is made by uniting the ends of the V-shaped parts $g'\ g'$, punched in the heads $c$, by lapping and fastening them together by gum or glue securely, as plainly seen.

The V-shaped parts of the heads of the spool E are turned inward and a metallic band inserted, the end of which is formed up into a flange or rim to hold them on. When the spool is filled with thread, the heads and barrel are bound securely together by the thread, as will be seen by Fig. 22.

The spool F is constructed of metal, and where more than ordinary strength is required the heads $c$ may be corrugated or grooves stamped therein for this purpose. The V-shaped parts $h$ are secured to the barrel $i$ by soldering, and a flange, $e$, turned up to still further strengthen the spool, as plainly shown in Figs. 7, 15, and 21.

I would here state that I have marked the spools alphabetically to prevent confusion in describing them, and, though slightly different in construction, they are all within the spirit and scope of my invention.

When the spools are to be filled, they are placed in a holder, which grasps and gives firm support to the heads, keeping them in place until taken out. When the supports are removed, the heads yield and present but feeble resistance to the thread, (which has been stretched in winding,) contracting to its original length, thus preserving unimpaired its elasticity.

I would here state that machines making the lock-stitch and sustaining the highest reputation have been with slight and inexpensive alterations arranged to use the under thread (which has formerly been rewound upon metallic bobbins) directly from these spools, and the sewing was never equaled for uniformity, elasticity, and durability.

Spools made as above described cost but a fraction of those ordinarily used, and from the small bulk and light weight the cost of transportation and storage is correspondingly less.

I claim—

1. Uniting the parts of spools and forming the tube or barrel thereof by the stock of the heads turned inward, substantially as described and specified.

2. Securing the heads upon the tube or barrel by pinching them between the flanges raised in the tube or barrel, substantially as set forth and specified.

DWIGHT TRACY. [L. S.]

Witnesses:
 WM. GREENLEAF,
 GEO. HOBBS.